W. B. COGGER.
SEWING-MACHINE CASTERS.
No. 184,342. Patented Nov. 14, 1876.
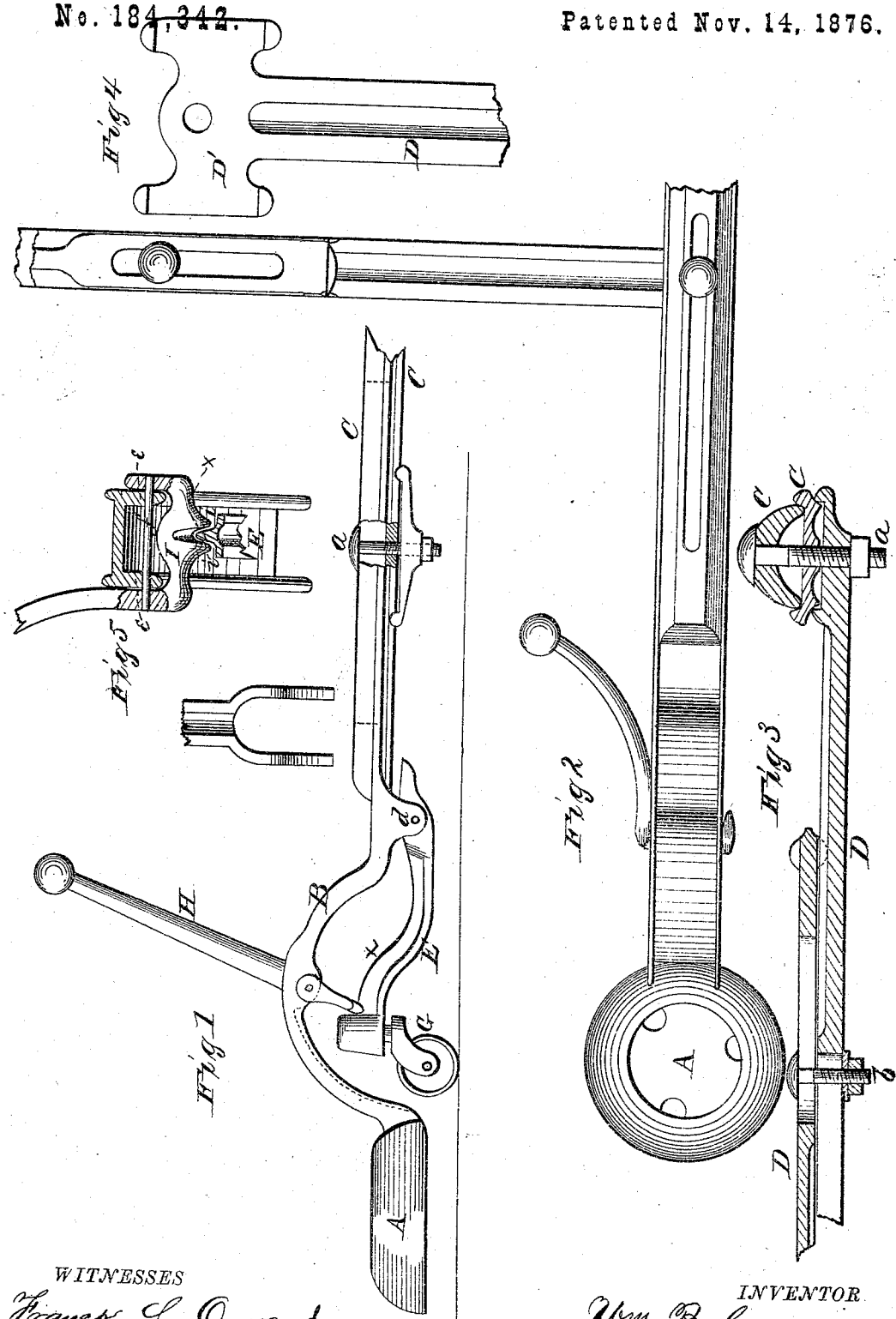

UNITED STATES PATENT OFFICE.

WILLIAM B. COGGER, OF MORRIS, ILLINOIS.

IMPROVEMENT IN SEWING-MACHINE CASTERS.

Specification forming part of Letters Patent No. 184,342, dated November 14, 1876; application filed May 29, 1876.

*To all whom it may concern:*

Be it known that I, WILLIAM B. COGGER, of Morris, in the county of Grundy, and in the State of Illinois, have invented certain new and useful Improvements in Casters for Sewing-Machines; and do hereby declare that the following is a full, clear, and exact description thereof, reference being had to the accompanying drawings, and to the letters of reference marked thereon, making a part of this specification.

The nature of my invention consists in the combination, with the caster-frame, as hereinafter described, of a hinged arm, provided with a ridge, and carrying the caster, and a pivoted lever, provided with an arm and projecting lips for raising and lowering the machine upon the caster-frame, all as hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a plan view, of my invention. Figs. 3, 4, and 5 are detailed views of parts thereof.

A represents the toe-piece, in the form of a circular box for receiving the foot of the sewing-machine. This toe-piece A is formed at one end of an arch, B, from the other end of which extends an arm, C, and this arm is slotted longitudinally for a certain distance at its end. Two of these castings are used on each side of the machine, the two arms C C overlapping each other, and fastened together by a bolt, a, passing through the slots therein. This bolt also passes through the head D' of an arm, D, which extends at right angles with the arms C. One of these arms, D, extends inward from each pair of side arms, and the inner ends of the arms D D overlap each other, and are fastened together by a bolt, b, passing through slots in the arms.

This constitutes the frame of my caster attachment, which can be extended and contracted at will, so as to adapt it for use on any sewing-machine.

At the outer end of the arm C, on each side, is a downwardly-projecting ear, d, and between the two ears is hinged a curved arm, E, the inner hinged end of which is forked, as shown, and the prongs extend inward beyond the hinge. The front or outer end of the arm E is curved upward, and in the end is formed a socket for the insertion of the shank of the caster G. H represents a lever, the lower end of which extends across at right angles, and the extreme end extends upward. This lever is hinged or pivoted, as shown in Fig. 5, by a rod, f, passing through ears e e. The horizontal part I of this lever is formed with two projecting lips, i i, which are intended to straddle a ridge, x, formed along the upper edge of the arm E, and press the caster down so as to raise the sewing-machine off from the feet—or, in other words, throw the machine on the casters, when it can be moved about in any direction.

By turning down the lever, the machine will settle down on the feet, the arm E and caster G turning upward into the arch B.

Having thus fully described my invention, what I claim as new, and desire to secure by Letters Patent, is—

The combination, with the frame A B C D, of the hinged arm E, formed with the ridge x, and provided with the caster G, and the pivoted lever H, provided with the arm I, having projecting lips i i, substantially as and for the purposes herein set forth.

In testimony that I claim the foregoing I have hereunto set my hand this 11th day of April, 1876.

WM. B. COGGER.

Witnesses:
H. D. HOWE,
W. A. PARKER.